United States Patent [19]

Sekiya et al.

[11] 4,444,288
[45] Apr. 24, 1984

[54] MUFFLER FOR INTERNAL COMBUSTION ENGINE

[75] Inventors: Mutuo Sekiya; Hideharu Tanaka, both of Amagasaki; Fusaoki Uchikawa, Kamakura; Yasufumi Ohata, Tokyo, all of Japan

[73] Assignee: Mitsubishi Denki Kabushiki Kaisha, Tokyo, Japan

[21] Appl. No.: 332,826

[22] Filed: Dec. 21, 1981

[30] Foreign Application Priority Data

Mar. 17, 1981 [JP] Japan ............... 56-40079[U]
Mar. 17, 1981 [JP] Japan ............... 56-40080[U]
Mar. 17, 1981 [JP] Japan ............... 56-40081[U]
Mar. 17, 1981 [JP] Japan ............... 56-40082
Mar. 17, 1981 [JP] Japan ............... 56-41385[U]

[51] Int. Cl.³ .................... F01N 1/10; F01N 1/14
[52] U.S. Cl. .................... 181/258; 181/252; 181/262
[58] Field of Search ........... 181/231, 245, 248, 249, 181/252, 256, 259, 262, 263, 276, 247, 250, 251, 257, 258

[56] References Cited

U.S. PATENT DOCUMENTS

| 2,075,758 | 3/1937 | Freund | 181/259 |
| 2,311,676 | 2/1943 | Maxim | 181/252 |
| 2,832,430 | 4/1958 | Coombs | 181/262 |
| 3,061,416 | 10/1962 | Kazokas | 181/231 X |
| 3,180,712 | 4/1965 | Hamblin | 181/276 X |
| 3,233,697 | 2/1966 | Slayter et al. | 181/245 |
| 3,471,265 | 10/1969 | Ciapetta et al. | 181/249 X |
| 3,511,617 | 5/1970 | Lyben | 181/249 X |
| 4,249,922 | 2/1981 | Saele | 55/315 |

Primary Examiner—Benjamin R. Fuller
Attorney, Agent, or Firm—Oblon, Fisher, Spivak, McClelland & Maier

[57] ABSTRACT

A muffler for an internal combustion engine comprises an air inlet passage in a casing of said muffler in a hollow surrounded by an inner wall of said casing and an outer wall of a porous sound absorber which is held in said casing.

15 Claims, 17 Drawing Figures

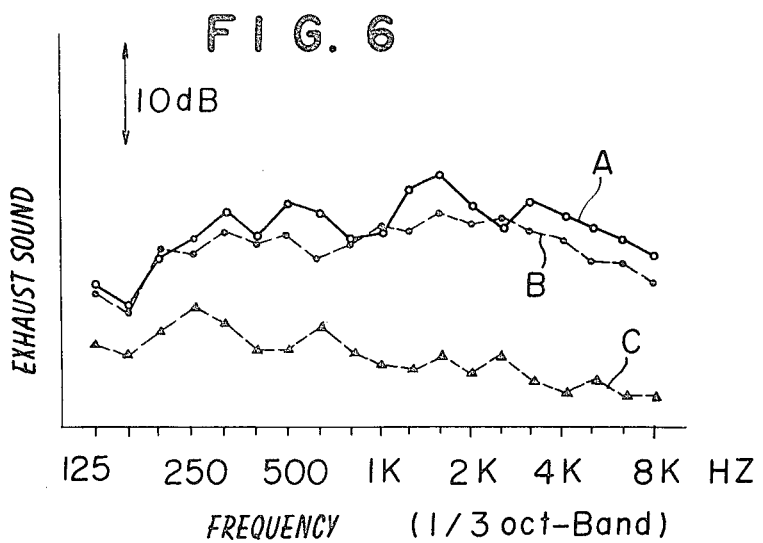
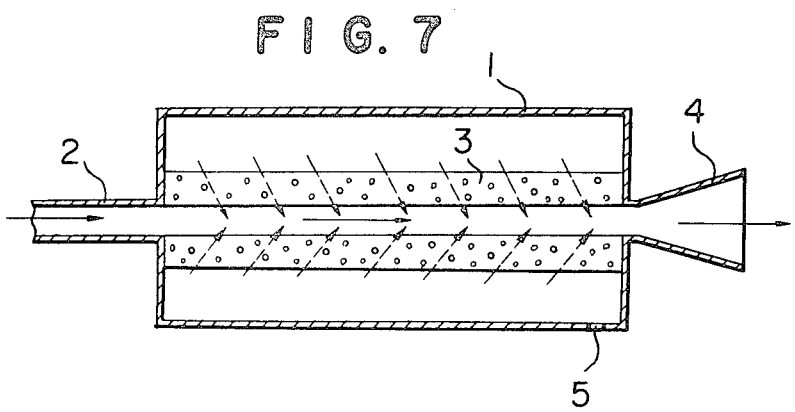
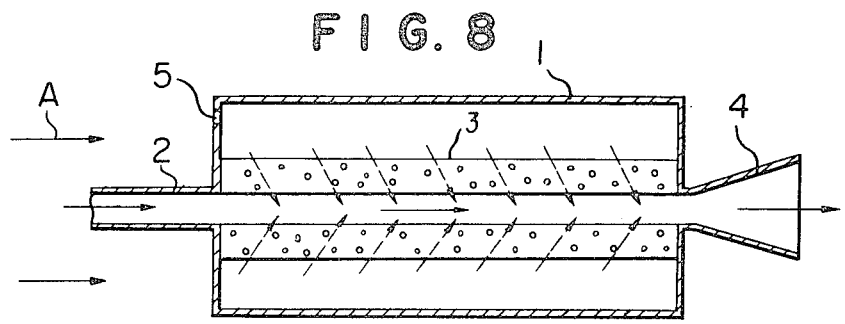
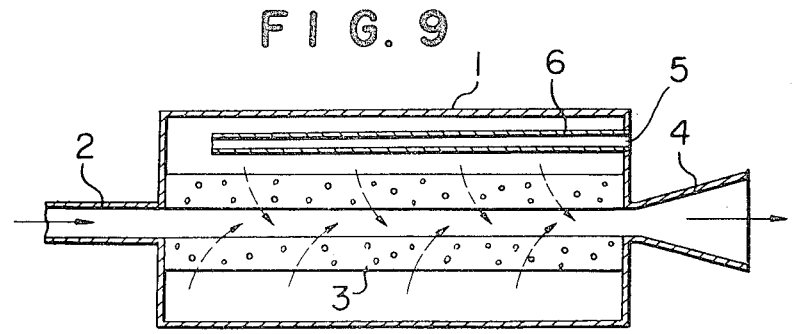

MUFFLER FOR INTERNAL COMBUSTION ENGINE

BACKGROUND OF THE INVENTION

1. Field of the Invention

The present invention relates to an improved muffler for an internal combustion engine.

2. Description of the Prior Art

In general, a muffler is connected at an outlet of an exhaust gas system of an internal combustion engine to reduce exhaust sound in an internal combustion engine. Such muffler has resistance to an exhaust gas flow to increase backpressure of the internal combustion engine and to reduce an output of the engine. Therefore, it has been desired to obtain a muffler having smaller pressure loss and higher muffler effect.

The muffler shown in FIG. 1 has been known. FIG. 1 is a schematic sectional view of a conventional muffler. In FIG. 1, the reference (1) designates a casing of the muffler: (a) to (c) respectively designate partition plates for dividing an internal space of the casing (1) into a plurality of compartments; (2) designates an inlet pipe which pass through the partition plates (a) to (c) to open in a space surrounded by the casing and the partition plate (c); (d) to (f) respectively communication pipes for connecting the spaces formed by the casing (1) and the partition plates (a), (b), (c); and (2') designates an outlet pipe one end of which is opened in a space surrounded by the casing (1) and the partition plate (a) and the other end of which is opened in the atmosphere.

In the muffler having the structure as shown by the arrow lines, the exhaust gas discharged from the engine is fed through the inlet pipe (2) into the space surrounded by the casing (1) and the partition plates (c) and is passed through the communication pipe (e) into the space surrounded by the casing (1) and the partition plates (a), (b) and is further fed through the communication pipe (d) into the space surrounded by the casing (1) and the partition plates (b), (c) and then, is fed through the communication pipe (f), the space surrounded by the casing (1) and the partition plate (a) and outlet pipe to the atmosphere. On the other hand, the exhaust sound leaked from the engine together with the exhaust gas is also discharged through the same passage to the atmosphere. During the steps of alternating propagation of the sound through the communication pipes (d), (e), (f) and the spaces surrounded by the casing (1) and the partition plates (a), (b), (c), sound energy density as a sound energy per unit area is reduced by expansion of sound wave in each space whereas the sound energy fed through each communication pipe to the next space is reduced. In such steps, the exhaust sound leaked from the outlet pipe (2') to the atmosphere is reduced. In the conventional muffler, however, the gas flow system in the muffler causes serious reduction and expansion of the sectional areas to increase the gas flow resistance whereby the back-pressure of the engine is increased and the output of the engine and the efficiency are disadvantageously reduced. The exhaust gas flow complicated gas passages whereby the flow momentum change is large to cause turbulent flow and the aerodynamic sound is secondarily resulted in the inside of the muffler to reduce the muffler effect. In such muffler, as well known, resonance phenomenon is easily caused to remarkably reduce the muffler effect in specific frequency regions. When the revolution speed of the engine is remarkably changed, it is indispensable to coincide the spectral frequency of the exhaust sound with the resonance frequency in specific revolution speed, whereby the muffler effect is remarkably reduced. These disadvantages have been found.

In order to overcome the disadvantages of the conventional muffler, it is necessary to linearly arrange the gas passage in the muffler to reduce the pressure loss. In order to attain a desired muffler effect in the linear arrangement of the gas passage in the muffler, it is necessary to use a sound absorber. The exhaust sound usually has spectral sounds in broad frequency regions. Thus, it is desired to use a sound absorber having sound absorbability in broad frequency region and accordingly, a porous sound absorber is preferably used. Thus, the exhaust gas contains tar and soot and the sound absorber causes clogging by adhering the tar and soot on the surface of the porous sound absorber and the sound is not passed through the sound absorber to remarkably reduce the sound absorbability. Therefore, in the equipment of the sound absorber in the muffler, it is necessary to prevent the clogging of the sound absorber caused by the adhesion of the tar and soot on the surface of the sound absorber.

SUMMARY OF THE INVENTION

It is an object of the present invention to overcome the disadvantages of the conventional muffler and to prevent the adhesion of tar and soot on a wall of a porous sound absorber and to reduce exhaust sound leaked through a through-hole of a casing and to improve attenuation effect of a muffler for an internal combustion engine.

It is another object of the present invention to prevent clogging of a sound absorber caused by tar and soot by feeding air from the atmosphere under a pressure difference given by reducing a pressure in the muffler from the atmospheric pressure and ejecting the air from rear surface of the sound absorber contacting with an exhaust gas.

BRIEF DESCRIPTION OF THE DRAWING

FIGS. 3 to 6 respectively show characteristics of the mufflers of the embodiments of the present invention;

FIGS. 7, 8 and 9 are respectively show the other embodiments;

DETAILED DESCRIPTION OF THE PREFERRED EMBODIMENTS

Figure 2:
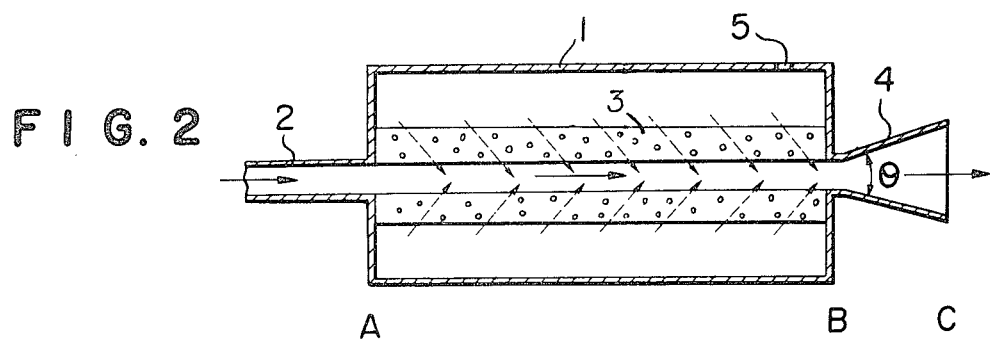
FIG. 2 is a sectional view of one embodiment of the muffler of the present invention.

Referring to FIG. 2, one embodiment of the present invention will be illustrated. In FIG. 2, the reference (1)

designates a casing of the muffler; (2) designates an inlet pipe one end of which is connected to the internal combustion engine (not shown) and the other end of which is connected to the casing (1); (3) designates a porous sound absorber in the cylindrical form having an inner diameter substantially the same as that of the inlet pipe (2) and said porous sound absorber is arranged in substantially linear to the casing (1); (4) designates a diffusor one end of which is connected to the casing (1) and the other end of which is opened in the atmosphere and a sectional area of which is enlarged in the direction of the gas flow; (5) designates a through-hole formed in the down flow side of the casing (1) to communicate the inside of the casing to the atmosphere.

In the muffler having said structure, as shown by the arrow full lines, the exhaust gas discharged from the engine is passed through the inlet pipe (2) through the inner side to the porous sound absorber (3) and is discharged from the diffusor (4) into the atmosphere. On the other hand, the exhaust sound discharged from the engine together with the exhaust gas is passed through the passage of the exhaust gas to be discharged into the atmosphere. The sound is absorbed into the porous sound absorber (3) to reduce the exhaust sound leaked through the diffuser (4) into the atmosphere.

The exhaust sound is also leaked through the through-hole (5) into the atmosphere. Thus, the through-hole is formed at the rear part of the casing at which the exhaust sound is reduced, and accordingly, the exhaust sound leaked through the through-hole is small to negligible.

The pressure in the part of the porous sound absorber for passing the exhaust gas is lower than the atmospheric pressure because of the following reason.

The positions of the inlet and outlet of the porous sound absorber and the outlet of the diffusor are respectively defined as A, B and C in FIG. 2. The following equation is given by Bernoulli's theorem:

$$P_A + \tfrac{1}{2}\rho V_A^2 = P_B + \tfrac{1}{2}\rho V_B^2 + h_B = P_C + \tfrac{1}{2}\rho V_C^2 + h_C \qquad (1)$$

wherein P designates a static pressure; V designates an exhaust gas flow velocity; $\rho$ designates an exhaust gas density; $h_B$ designates a resistant loss for the exhaust gas pressure by a porous sound absorber; and $h_C$ designates an expansion loss of the diffusor. The suffix A, B and C show positions for the tests.

The porous sound absorber is equipped in substantially linear to give only small resistance to the gas flow, whereby $h_B$ in the equation (1) is negligible. Moreover, the expansion loss $h_C$ is also negligible if the expansion angle ($\theta$) of the diffusor is not so large. The equation (1) may be modified as follows.

$$P_A + \tfrac{1}{2}\rho V_A^2 \approx P_B + \tfrac{1}{2}\rho V_B^2 \approx P_C + \tfrac{1}{2}\rho V_C^2 \qquad (2)$$

The sectional area for gas passage formed by the porous sound absorber is uniform along the flow direction. Therefore, it provides $V_A = V_B$ and the pressure $P_C$ is equal to the atmospheric pressure $P_0$. The following equation is derived from the equation (2).

$$P_A \approx P_B \approx P_0 + \tfrac{1}{2}\rho(V_C^2 - V_B^2) \qquad (3)$$

It provides $V_C < V_B$ by the effect of the diffusor. Therefore, the second term in the right of the equation (3) gives a negative pressure whereby the pressures $P_A$, $P_B$ at the passages of the exhaust gas in the porous sound absorber are lower than the atmospheric pressure $P_0$.

Therefore, as shown by the arrow dotted lines, air is fed through the through-hole (5) connected to the atmosphere into the casing and is passed through the porous sound absorber, and is ejected into the exhaust gas passage. The air flow prevents the adhesion of tar and soot contained in the exhaust gas, on the surface of the porous sound absorber.

Figure 1:
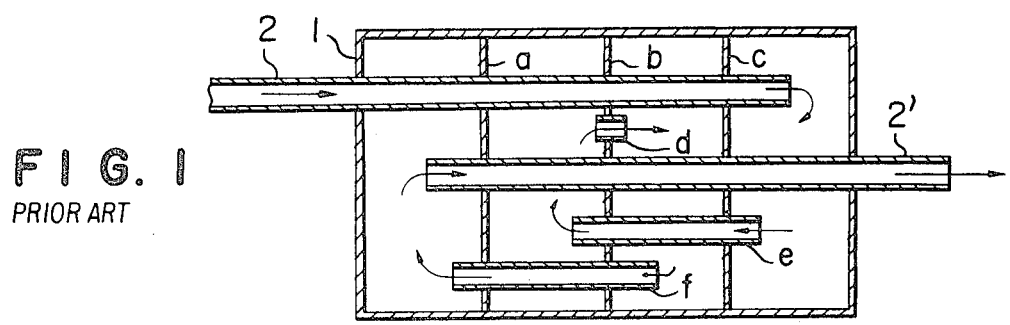
FIG. 1 is a sectional view of a conventional muffler for an internal combustion engine.
Figure 3:
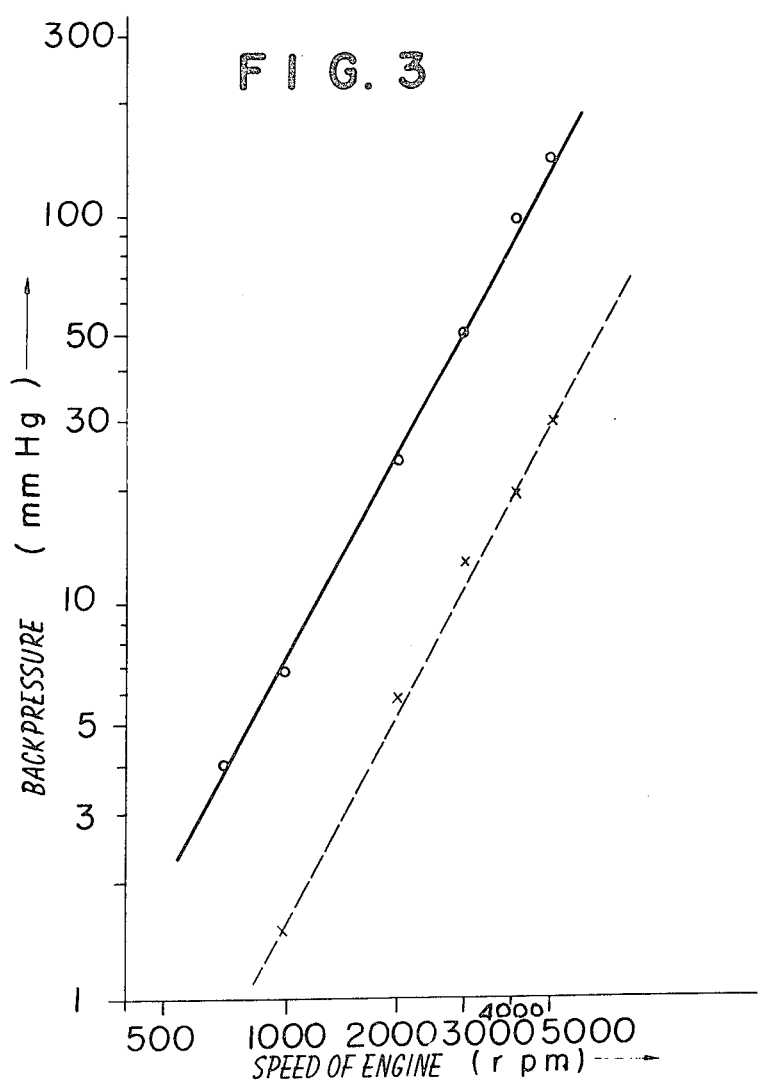

FIG. 3 shows results of measurements of backpressure in the case of the use of the muffler of the present invention as the muffler for car in comparison with those of the conventional muffler (FIG. 1). A commercially available gasoline engine of a car (piston displacement of 1,400 cc) is used as the internal combustion engine. The position for measurement of the backpressure is near the inlet of the muffler. The output of the engine is in 100% load. In FIG. 3, the full line shows the backpressure of the muffler of the present invention and the broken line shows that of the conventional muffler. As it is clearly found in FIG. 3, the backpressure in the muffler of the present invention is reduced to about $\tfrac{1}{4}$ of the backpressure in the conventional muffler.

Figure 4:
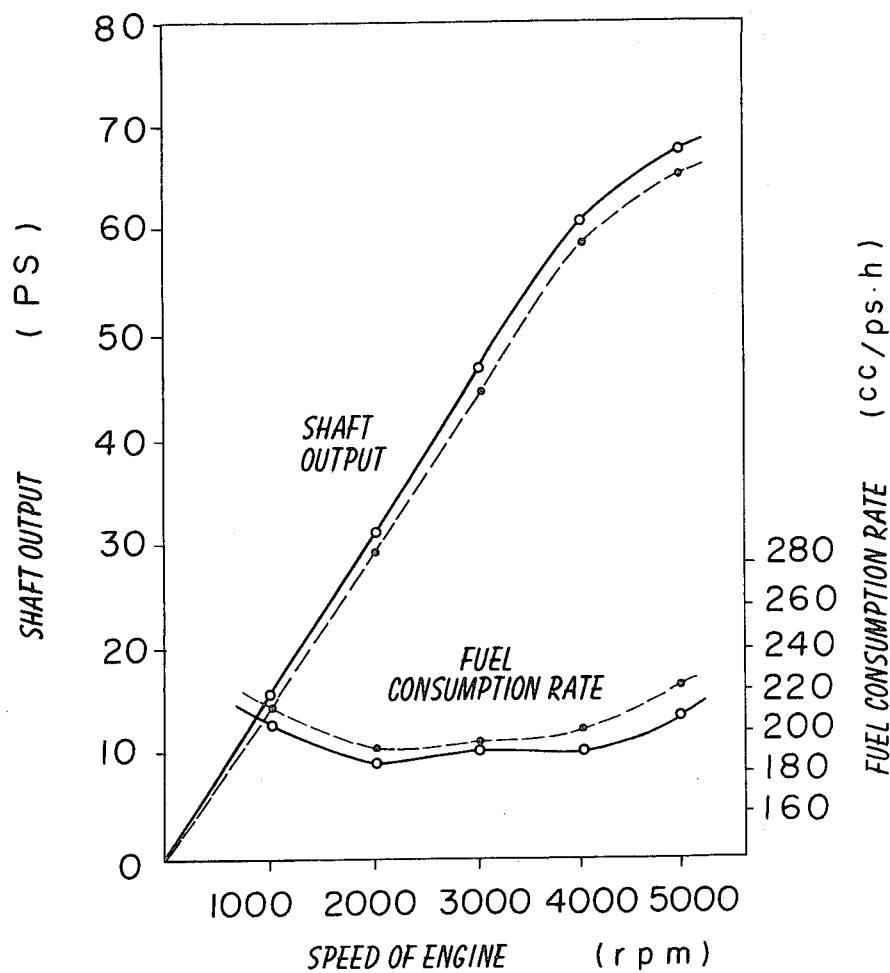

FIG. 4 shows the relations of outputs and revolution speeds of the engine. The measurements are pursuant to JIS D-1002. In FIG. 4, the full line shows the results of the muffler of the present invention and the broken line shows the results of the conventional muffler. As it is clearly found in FIG. 4, the output of the engine and fuel consumption rate in the muffler of the present invention are superior to those of conventional muffler. At the revolution speed of the engine of 5000 rpm, they are respectively superior by about 7%.

Figure 5:
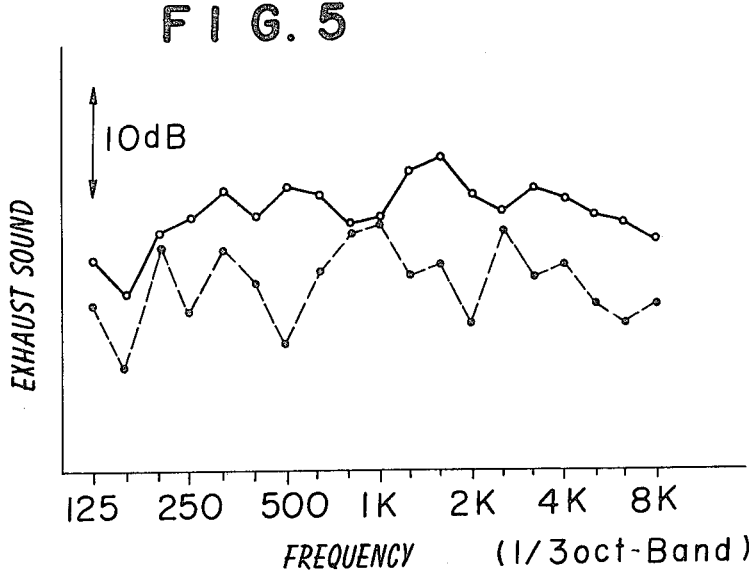

FIG. 5 shows characteristics of the muffler effects measured pursuant to JIS D-1616. The muffler effect is given by a difference of sound levels of exhaust sounds with or without the muffler. In FIG. 5, the full line shows the muffler effect of the muffler of the present invention and the broken line shows the muffler effect of the conventional muffler. As it is clearly found in FIG. 5, the muffler effect of the muffler of the present invention is superior to that of the conventional muffler. Moreover, the serious lowering of the muffler effect in certain frequency regions is not found in the muffler of the present invention though it is found in the conventional muffler.

FIG. 6 shows the results of deterioration of the muffler effect in the case of each driving of a car (piston displacement of 1400 cc) equipped with the muffler of the present invention for about 10,000 km. The curves A and B respectively show characteristics of the muffler effects at the initiation and after the driving for 10,000 km. After the driving, the muffler effect is slightly deteriorated but it is negligible. In the disassembling of the muffler, the adhesion of tar and soot on the surface of the porous sound absorber is only small. The curve C shows the muffler effect in the case of closing the through-hole. The air flow is prevented whereby tar and soot are adhered on the sound absorber to cause serious deterioration of the muffler effect.

In the aforementioned embodiment, the through-hole is formed at the upper surface of the rear part of the casing. It is possible to form the through-hole (5) on the lower surface of the rear part of the casing as shown in FIG. 7. In this embodiment, the through-hole imparts a function as a drain of a condensed water produced in the muffler. In the starting of the internal combustion engine or in the case of remarkably lower ambient temperature, the temperature in the exhaust gas system of the internal combustion engine is low whereby steam in the exhaust gas discharged from the internal combustion engine is condensed to produce water. Hydrogen sulfite gas in the exhaust gas is dissolved into the condensed gas to produce sulfuric acid. Therefore, the condensed water is usually highly corrosive. Thus, it is advantageous to form a drain hole at the position for easily storing the condensed water on the casing of the muffler.

FIG. 8 shows the other embodiment of the present invention. The through-hole (5) is formed on the front end surface of the casing (1). In this embodiment, the through-hole is formed at the front side of the muffler at the position for higher sound level in the casing. It may be considered to cause large exhaust sound leaked through the through-hole into the atmosphere. Thus, in the application in a car, the sectional area of the through-hole can be remarkably smaller than that of the through-hole formed at the rear part of the casing whereby the exhaust sound leaked through the hole can be reduced because of the following reason.

In the application as the muffler for a car, air flow is formed around the muffler depending upon the speed of the car. When the front end surface of the muffler is placed in substantially perpendicular to the air flow (the arrow line A), (a muffler for a car is usually equipped under such condition), the pneumatic energy of the air flow can be utilized for feeding air into the inside of the casing. Therefore, the sectional area of the through-hole can be remarkably reduced in comparison with the embodiments shown in FIGS. 2 to 7. In this embodiment, the through-hole is formed on the upper front end surface of the casing. It is also effective to form the through-hole at the lower front end surface of the casing to use it as the drain hole because of the same reason for the embodiment shown in FIG. 7.

Figure 10:
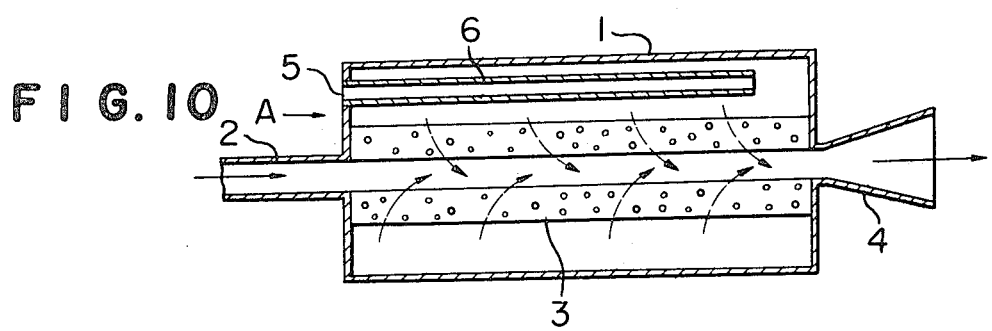
FIG. 10 is a sectional view of the other embodiment of the muffler of the present invention.

FIGS. 9 and 10 show other embodiments. In the embodiment shown in FIG. 9, one end of an air inlet pipe (6) is connected to the through-hole (5) of the rear end surface of the casing and the other end of the air inlet pipe is opened in upper stream of the hollow surrounded by the outer wall of the porous sound absorber (3) and the inner wall of the casing.

In the muffler having this structure, the air inlet pipe (6) is heated to high temperature by the heat of the exhaust gas for a short time after the start of the engine. Thus, cold air fed from the atmosphere through the through-hole (5) is heated by the heat-exchange in the pipe (6) and the air at a relatively high temperature is sucked into the muffler. The air fed into the muffler is passed from the rear surface of the porous sound absorber to the surface of the absorber contacting with the exhaust gas without cooling the porous sound absorber (3) whereby the adhesion or penetration of the tar and carbon from the exhaust gas can be effectively prevented.

The exhaust sound leaked through the through-hole (5) is attenuated by passing the exhaust sound through the air inlet pipe (6) having a relatively small sectional area. Thus, the exhaust gas leaked through the through-hole (5) can be reduced and the muffler effect is improved.

In the embodiments shown in FIGS. 9 and 10, the through-hole (5) is formed on the rear end surface or the front end surface of the casing (1) at the upper position. It is possible to form the through-hole at a lower position or side position. Even though the through-hole (5) is formed on the upper or lower surface of the front or rear part of the casing, the similar muffler effect can be expected by connecting the air inlet pipe (6). In order to increase the heat-exchange efficiency of the air inlet pipe (6) it is possible to provide fins on the pipe (6).

Figure 11:
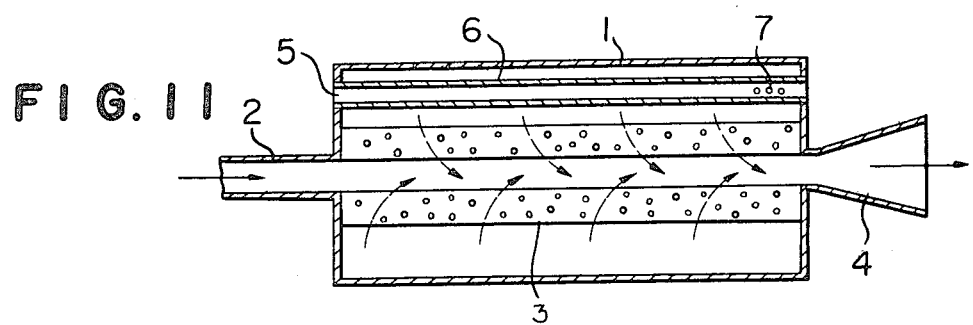
FIGS. 11, 12 and 13 are respectively sectional views of the other embodiments of the muffler of the present invention in which an air inlet pipe is supported at both open ends by both end plates.
Figure 12:
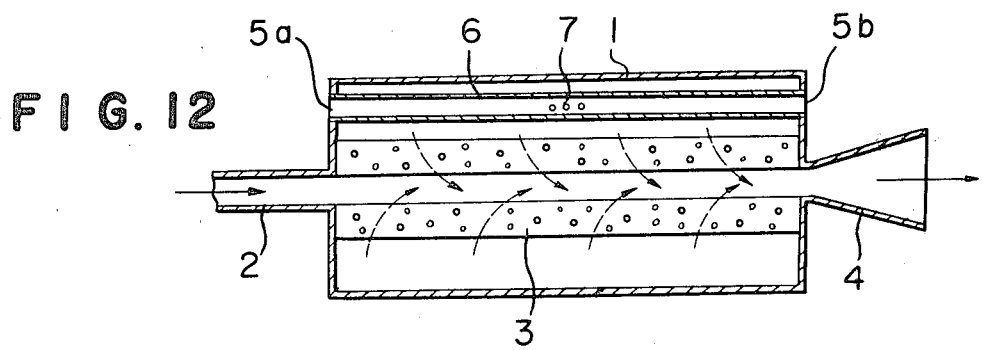
Figure 13:
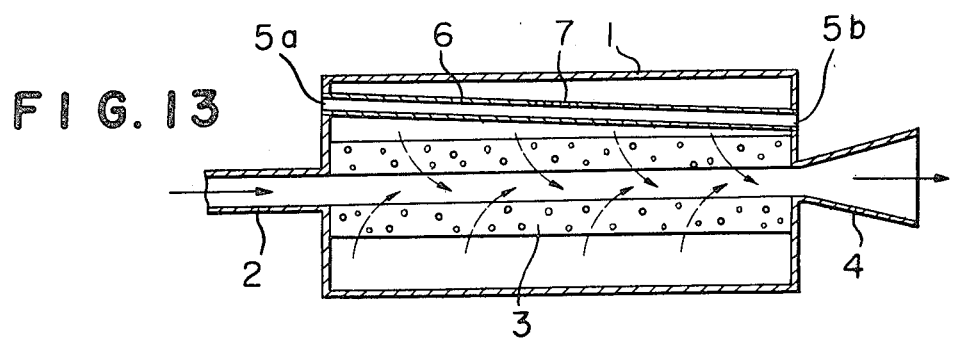

Referring to FIGS. 11, 12 and 13, the other embodiments will be illustrated.

In the embodiment shown in FIG. 11, an air inlet pipe (6) is held in the casing (1) by connecting one end to the through-hole (5) of the front end plate and the other end to the rear end plate and holes (7) are formed at the rear part of the pipe (6) so as to feed air sucked through the through-hole (5) into the muffler. In accordance with the embodiment, the both ends of the air inlet pipe (6) are connected to the casing (1) whereby the mechanical strength and the durability are improved.

In the embodiment of FIG. 12, both through-holes (5a), (5b) are formed on the front and rear end plates of the casing (1) and the air inlet pipe (6) is connected to the both through-holes (5a), (5b) at both ends to open the both ends and holes (7) for air feeding are formed at the middle part of the pipe (6). In accordance with this embodiment, dust in the air is quite small in the non-driving and accordingly the muffler effect is not lost. During the driving, a large amount of the dust is formed by the rear wheels and the dust is sucked into the through-hole (5a), but the most of the dust is passed through the pipe (6) to discharge from the through-hole (5b). The dust is not substantially sucked through the holes (7) formed on the pipe (6) into the muffler.

In the embodiment of FIG. 13, the air inlet pipe (6) is placed in slant to the axial center line of the casing (1) for a desired angle to prevent the storage of the condensed water in the pipe (6) and the holes (7) are formed at the upper side of the middle part of the pipe (6). When a car drives on a wet road, water droplets are rolled up by the rear wheels to enter through the through-holes (5a), (5b) formed on the casing (1). When a large amount of water is entered into the pipe (6), water is entered into the muffler to cause corrosion of the muffler or deterioration of the muffler effect. In the embodiment, the pipe (6) is placed in slant and the holes (7) are formed at the upper side of the pipe (6) whereby water is not entered into the muffler.

Figure 14:
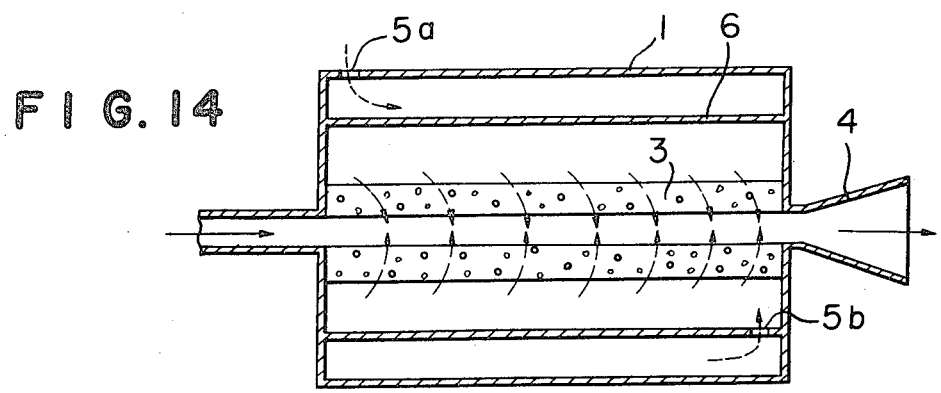
FIG. 14 is a sectional view of the other embodiment of the muffler of the present invention.

In the embodiment shown in FIG. 14, an inner cylinder (6) is placed in the casing between the casing (1) and the porous sound absorber (3) and through-holes (5a), (5b) are formed on the casing (1) and the inner cylinder (6). The air is fed through the through-hole (5a) formed on the casing (1) and the through-hole (5b) formed on the inner cylinder connected in the casing. The inner cylinder is heated by the exhaust gas and accordingly the passage formed by the casing and the inner cylinder is effective as the heat-exchanger to preheat the air and the porous sound absorber is not cooled by the sucked air to prevent the adhesion of the tar and carbon on the wall of the absorber. The inner cylinder formed a jacket structure to reduce the exhaust sound. The passage formed by the casing and the inner cylinder imparts the effect for a reactive muffler. A plurality of the inner cylinders can be formed.

In these embodiments, the effect for removing the tar and soot is increased when the flow rate of air fed from the rear surface of the sound absorber is increased. The sectional area of the hole (5) must be increased depending upon the increase of the flow rate whereby the muffler effect of the muffler is reduced. Therefore, it is necessary to employ a manner for preventing the adhesion of the tar and soot even though the sectional area of the hole (5). Thus, the characteristics of the muffler can be further improved by placing a low temperature oxidizing catalyst on the surface of the sound absorber (3) to utilize oxygen at a ratio of about 20% of air fed so as to perform the combustion of tar and soot and to utilize the flow of nitrogen at a ratio of about 80% so as to remove the tar and soot from the sound absorber.

The porous sound absorber can be the improved sound absorber which comprises a layer of a composition of a heat resistant binder and a low temperature oxidizing catalyst in the hardened form which is coated on a porous metal substrate.

The coated layer comprises the heat resistant binder and the low temperature oxidizing catalyst made of at least one of an oxide of Mn, Cu, Ni, Co, Mo, Cr, Fe, Ag, Zn, Pb, W or V or a complex oxide thereof or a metal of Pt, Pd, Rh, Ru, Ag or Au.

The coated layer has a matrix made of at least one of porcelain enamel, glass frit, an alkali metal silicate, colloidal silica, colloidal alumina, a metal phosphate, a cement or a silicone resin (varnish).

The porous metal substrate can be made of at least one of iron, nickel or chromium as a main component.

The coated layer is preferably porous and is preferably formed on one surface of the porous metal substrate.

It is possible to incorporate a reducing agent and/or an alkaline solid catalyst in the layer of the composition of a heat resistant binder and a lower temperature oxidizing catalyst.

The reducing agent can be at least one of metallic powders, carbon powder, sulfites, ferrous salts and stannous salts which are thermally stable.

The alkaline solid catalyst can be at least one of potassium silicate, sodium aluminate, sodium silicate, lithium silicate, sodium carbonate and alkali metal oxides.

A content of the lower temperature oxidizing catalyst in the coated layer is in a range of 5 to 85 wt.% preferably 20 to 60 wt.%. A content of the reducing agent and/or the alkaline solid catalyst in the coated layer is up to 50 wt.%.

It is especially preferable to have the coated layer made of a matrix of silicone resin and manganese oxide powder and the porous metal substrate made of iron, nickel and/or chromium which is prepared by a powdery metallurgy.

The porous metal substrate preferably has a thickness of 2 to 10 mm and a porosity of 40 to 95%.

The coated layer preferably has a thickness of 10 to 80 μm a specific surface area of 50 to 500 m²/g. JIS=-Japanese Industrial Standard

EXAMPLE 1

Figure 15A:
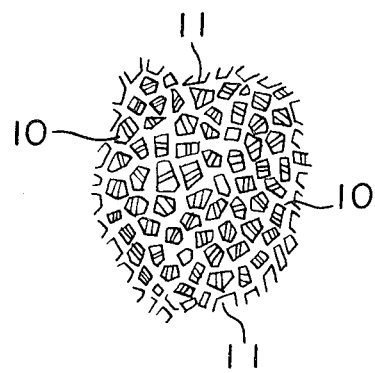
FIGS. 15 (a), (b) respectively show enlarged structures of the sound absorber used in the embodiment shown in FIG. 14.

A porous metal substrate made of nickel having a thickness of 5 mm which has a microscopic enlarged surface shown in FIG. 15(a) (manufactured by Sumitomo Elect. Ind. JAPAN) was used as a metallic porous acoustic absorbing substrate. A mixture obtained by mixing the components of the Composition No. 1 by a ball mill for about 30 minutes, was sprayed to uniformly coat it on the porous metal board. In FIG. 15(a), the reference (10) designates a porous metal substrate and (11) designates pores. The coated layer was dried at 80° C. for 30 minutes and backed at 550° C. for 30 minutes to form a hard layer. In the coating of the mixture, if the coated layer is too thick, the sound absorption characteristic is too low.

| Composition No. 1: | |
|---|---|
| Low temperature oxidizing catalyst: | |
| Manganese dioxide | 50 wt. parts |
| Binder: | |
| Aluminum phosphate | 40 wt. parts |
| Additives: | |
| Alumina, bentonite, water | 60 wt. parts |

The additives improve coating property and characteristics of the coated layer and increase the strength of the coated layer and the adhesion on the porous metal substrate and form a porous coated layer.

Figure 16:
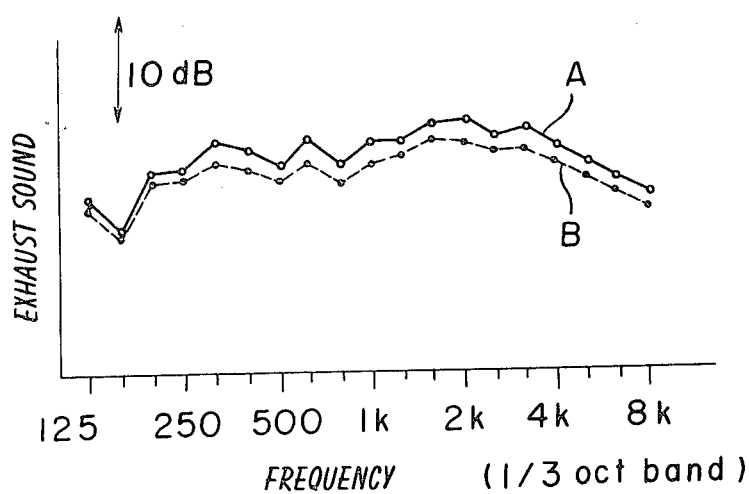
FIGS. 16 and 17 are respectively show characteristics of the muffler of the embodiment shown in FIG. 14.

The porous sound absorber having a coated layer containing the low temperature oxidizing catalyst was used as the porous sound absorber in the muffler shown in FIG. 2 and the muffler was used for a gasoline engine of a car (piston displacement of 1,400 cc) and a deterioration of muffler effect was measured. The result is shown in FIG. 16. The curves A and B respectively show muffler effects at the initiation and after the driving for about 20,000 km. After the driving for about 20,000 km, the muffler effect was slightly deteriorated, but it was substantially negligible. After the driving for about 20,000 km, the muffler was disassembled and the surface of the sound absorber was observed. The adhesion of tar and soot was negligible.

EXAMPLE 2

Figure 15B:
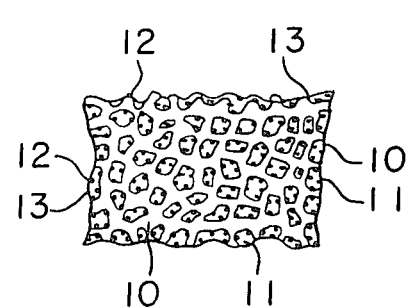

A powder-sintered metal board made of gun metal having the enlarged structure shown in FIG. 15(b) was used as a porous sound absorbing substrate. The mixture having the following composition 2 was kneaded and sprayed to coat it on the sintered metal board and baked it to form a hardened layer. In FIG. 15(b), the reference (12) designates the low temperature oxidizing catalyst; and (13) designates a heat resistant binder.

| Composition 2: | |
|---|---|
| Low temperature oxidizing catalyst: | |
| Copper oxide | 50 wt. parts |
| Binder: Silicone resin | 30 wt. parts |
| Additives: Silicate, calcium oxide and thinner | 60 wt. parts |

Figure 17:
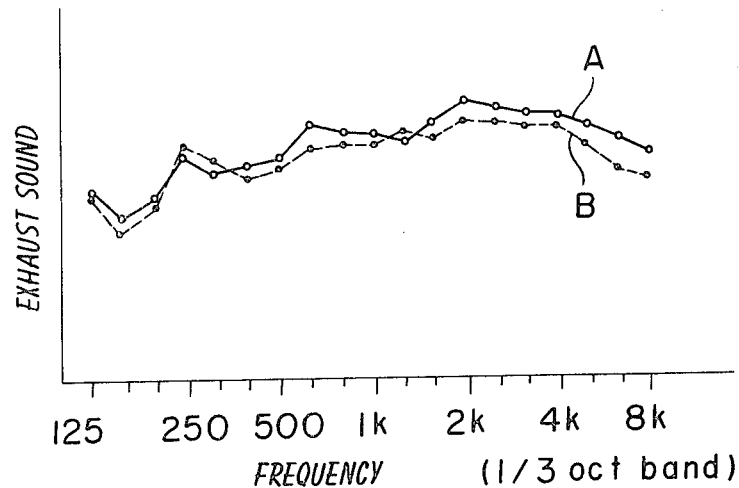

The porous sound absorber having the coated layer containing the low temperature oxidizing catalyst was used in the muffler for the car as set forth in Example 1 and a deterioration of the muffler effect was measured. The results are shown in FIG. 17. The curves A and B respectively show muffler effects at the initiation and after the driving for about 20,000 km as set forth in Example 1. As it is clearly found in FIG. 17, the deterioration of the muffler effect was substantially negligible.

As described, the muffler for internal combustion engine of the present invention is prepared by a substantially linear cylindrical porous sound absorber in the muffler to eject air from the atmosphere into the porous sound absorber by the effect of the diffusor connected at the outlet of the muffler whereby the deterioration of the muffler effect caused by the clogging with tar and soot is prevented to maintain the excellent initial muffler effect for a long time.

We claim:

1. A muffler for an internal combustion engine, said muffler comprising:
   (a) a casing extending along a longitudinal axis, said casing having an inlet at one longitudinal end thereof and an outlet at the other longitudinal end thereof in axial alignment with said inlet, said inlet and said outlet being of substantially the same diameter;
   (b) a porous sound absorber in tubular form extending from said inlet of said casing to said outlet of said casing, said porous sound absorber having an inner diameter substantially the same as said inlet and said outlet of said casing and an outer diameter which is substantially less than the inner diameter of said casing, thereby defining an annular empty volume between said porous sound absorber and said casing;
   (c) a diffuser the inlet of which is connected to said outlet of said casing and the outlet of which is open to the atmosphere, said diffuser acting to create a pressure inside said porous sound absorber which is less than the ambient pressure, which less than ambient pressure is in turn communicated through said porous sound absorber to said annular empty volume between said porous sound absorber and said casing; and
   (d) a through-hole formed in said casing to permit ambient air to be drawn into said annular empty volume between said porous sound absorber and said casing, through said porous sound absorber, and out through said outlet of said casing, which flow of ambient air prevents the adhesion of tar and soot contained in the exhaust gas to the inner surface of said porous sound absorber.

2. A muffler as recited in claim 1 wherein said through-hole is formed in the upper, downstream part of said casing.

3. A muffler as recited in claim 1 where said through-hole is formed in the lower downstream part of said casing, whereby said through-hole also functions as a drain for condensed water produced in the muffler.

4. A muffler as recited in claim 1 wherein said through-hole is formed in the upstream longitudinal end of said casing.

5. A muffler as recited in claim 1 and further comprising an air inlet pipe which extends from said through-hole to a point in said annular empty volume between said porous sound absorber and said casing.

6. A muffler as recited in claim 5 wherein said through-hole is formed in the downstream longitudinal end of said casing and said point is near the upstream longitudinal end of said casing.

7. A muffler as recited in claim 5 wherein said through-hole is formed in the upstream longitudinal end of said casing and said point is near the downstream longitudinal end of said casing.

8. A muffler as recited in claim 5 wherein said inlet pipe is connected to said casing at both ends, whereby its mechanical strength and durability are improved, and at least one hole is formed in said inlet pipe intermediate its end to permit ambient air to pass from the interior of said inlet pipe to said annular empty volume between said porous sound absorber and said casing.

9. A muffler as recited in claim 8 wherein said at least one hole is formed in the downstream portion of said inlet pipe.

10. A muffler as recited in claim 8 wherin said at least one hole is formed in the middle portion of said outlet pipe.

11. A muffler as recited in claim 8 wherein:
    (a) the downstream end of said inlet pipe is connected to an outlet opening in said casing;
    (b) said through-hole is vertically above said outlet opening in said casing;
    (c) said holes are formed in the upper wall of said inlet pipe; and
    (d) said inlet pipe slants continuously downwardly from said through-hole to said outlet opening, whereby water which enters said inlet pipe through said through-hole flows through said inlet pipe and out said outlet opening.

12. A muffler as recited in claim 1 and further comprising an inner cylinder extending longitudinally from the upstream longitudinal end of said casing to the downstream longitudinal end of said casing between and spaced from both said porous sound absorber and said casing, thereby dividing said annular empty volume into a radially inward portion and a radially outward portion, said through-hole communicating with said radially outward portion of said annular empty volume and said inner cylinder containing a second through-hole which permit ambient air to pass from said radially outward portion of said annular empty volume to said radially inward portion thereof.

13. A muffler as recited in claim 12 wherein said through-hole and said second through-hole are on opposite sides of said porous sound absorber.

14. A muffler as recited in claim 1 wherein said porous sound absorber comprises:
    (a) a layer of a composition of a heat resistant binder and
    (b) a low temperature oxidizing catalyst which is coated on a porous metal substrate in the hardened form.

15. A muffer as recited in claim 14 wherein said low temperature oxidizing catalyst is made of at least one of an oxide of Mn, Cu, Ni, Co, Mo, Cr, Fe, Ag, Zn, Pb, W, or V, or a complex oxide thereof, or a metal of Pt, Pd, Rh, Ru, Ag, or Au.

* * * * *